United States Patent
Barrenscheen et al.

(10) Patent No.: US 7,971,076 B2
(45) Date of Patent: Jun. 28, 2011

(54) CIRCUITRY AND METHOD FOR MONITORING A SUPPLY VOLTAGE

(75) Inventors: Jens Barrenscheen, Munich (DE); Rainer Herold, Munich (DE); Dietmar Koenig, Munich (DE); Tim Weyland, Merching (DE)

(73) Assignee: Infineon Technologies AG

( * ) Notice: Subject to any disclaimer, the term of this patent is extended or adjusted under 35 U.S.C. 154(b) by 849 days.

(21) Appl. No.: 11/863,303

(22) Filed: Sep. 28, 2007

(65) Prior Publication Data

US 2009/0085551 A1 Apr. 2, 2009

(51) Int. Cl.
*G06F 1/32* (2006.01)
*G06F 19/00* (2011.01)

(52) U.S. Cl. ........ 713/300; 713/310; 713/320; 713/321; 713/322; 713/323; 713/324; 713/330; 713/340

(58) Field of Classification Search .................. 713/300, 713/310, 320–324, 330, 340
See application file for complete search history.

(56) References Cited

U.S. PATENT DOCUMENTS

| 4,327,253 | A | * | 4/1982 | Lechner ...................... 379/384 |
| 5,539,910 | A | | 7/1996 | Brueckmann et al. |
| 7,116,139 | B2 | | 10/2006 | Mitchell |

* cited by examiner

*Primary Examiner* — Abdelmoniem Elamin

(57) ABSTRACT

A method for monitoring the supply voltage of an electronic device includes the steps of: determining an operating condition of the electronic device, adjusting a plurality of reference voltages dependent on the operating condition of the electronic device, wherein each of the plurality of reference voltages is adjusted at a different time, and comparing the supply voltage of the electronic device with at least one of the plurality of reference voltages.

16 Claims, 4 Drawing Sheets

US 7,971,076 B2

CIRCUITRY AND METHOD FOR MONITORING A SUPPLY VOLTAGE

FIELD OF THE INVENTION

The invention relates to the monitoring of supply voltages for electronic devices.

BACKGROUND

The operation of an electronic device like, for example, a processor system is often influenced by the supply voltage. The maximum speed, at which a stable operation is still possible, may depend on the supply voltage. Usually the signal delays inside an electronic device are lower at higher supply voltages and thus higher operation frequencies are possible at higher voltages. The capability of a processor system to store values in internal registers or memories usually also depends on the supply voltage and gets better at higher supply voltages. At lower voltages the risk can increase that a value stored in a register or memory can be altered unintentionally. Furthermore, the power consumption in most cases is higher at higher supply voltages.

Sometimes there is a desire to operate the electronic device in different operation modes with different requirements regarding, for example, speed or power consumption. In these different operation modes, the electronic device usually operates with different supply voltages. Preferably an electronic device is operated with the lowest possible supply voltage in order to save power. The lowest possible supply voltage often depends on the operation requirements, for example regarding speed. The operation mode may be changed dynamically during operation.

Advantageously the supply voltage is monitored to determine whether it meets the requirements for the respective operation mode. For this purpose the supply voltage is compared with a reference voltage. A problem exists in monitoring the supply voltage during changes of the supply voltage since in this phase the reference voltage is also changed.

SUMMARY OF THE INVENTION

A method for monitoring the supply voltage of an electronic device includes the steps of: determining an operating condition of the electronic device, adjusting a plurality of reference voltages dependent on the operating condition of the electronic device, wherein each of the plurality of reference voltages is adjusted at a different time, and comparing the supply voltage of the electronic device with at least one of the plurality of reference voltages.

DETAILED DESCRIPTION

In the following a processor system is described as one embodiment of an electronic device. However, the invention can be applied in any other type of electronic device using a supply voltage.

Figure 1:
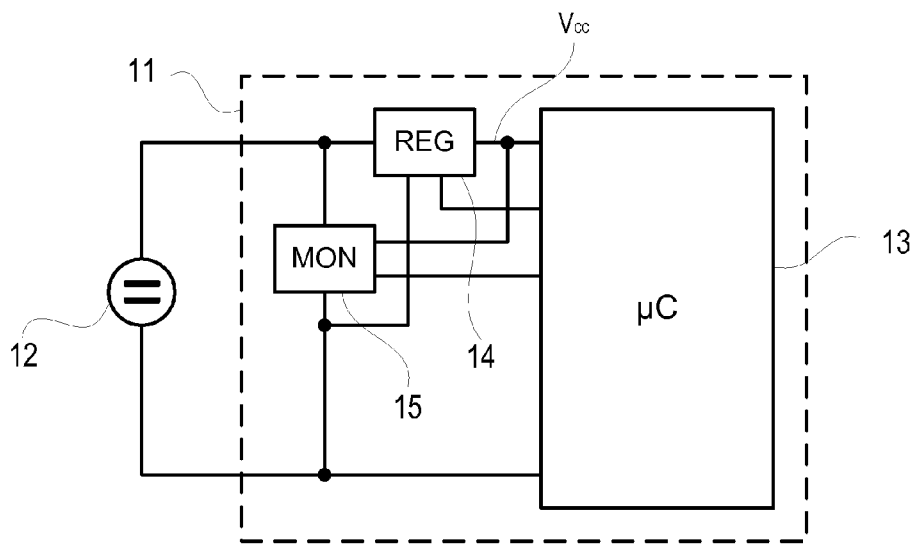
FIG. 1 shows a schematic block diagram of a processor system adapted to monitor the supply voltage in accordance with an embodiment of the present invention.

FIG. 1 shows a schematic block diagram of a processor system 11 that is operated with a voltage provided by a voltage source 12. The voltage source 12 can be any device that provides a voltage for powering the processor system 11 such as, for example, a connection to power lines or a linear or a switching power supply. The processor system 11 may be integrated on a single silicon die or may comprise several dies. Furthermore, it may be integrated in a single package. It may also be integrated together with discrete components. The aforementioned possibilities can also be applied to subsets of functional blocks of the processor system 11. The monitoring device 15 may be a discrete component whereas the regulator 14 may be integrated together with a processor. Furthermore, the monitoring device 15 may be integrated together with the regulator 14. The present invention can be used for every kind of system that provides a monitored supply voltage like, for example, for point-of-load voltage regulation and for voltage trackers.

The voltage source 12 is coupled to a voltage regulator 14 that provides at an output a supply voltage Vcc to a processor that in the described embodiment is a microcontroller 13 but can be of any other type of electronic device. The processor system 11 further comprises a monitoring device 15 that is also powered by the voltage source 12 and that is coupled to the output of the regulator 14 and the microcontroller 13. The monitoring device 15 can measure the value of the supply voltage Vcc. The monitoring device 15 can be controlled or programmed through the connection to the microcontroller 13. Monitoring device 15 can generate internally a first and a second reference voltage that can be compared with the supply voltage Vcc. Optionally, the monitoring device 15 can generate more than two reference voltages.

Figure 2:
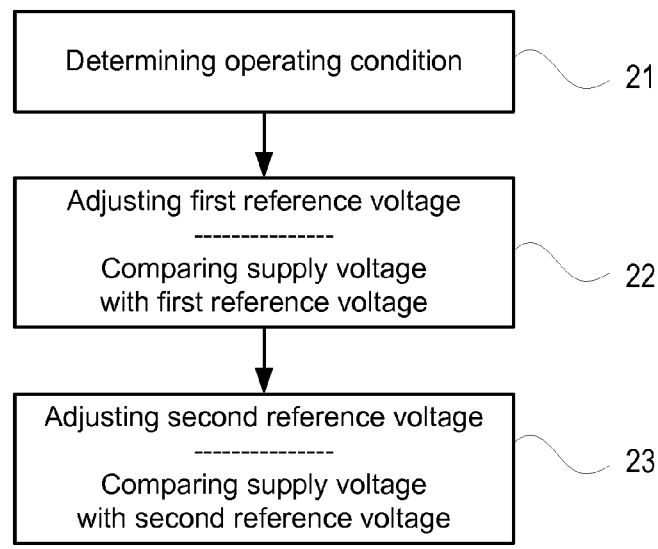
FIG. 2 is a flow chart of a method for monitoring the supply voltage of a processor system in accordance with an embodiment of the present invention.

FIG. 2 is a flow diagram of the monitoring of the supply voltage Vcc within the processor system of FIG. 1. In a first step 21, an operating condition of the processor system is determined. The operating condition may be characterized by specific speed limitations or requirements or specific current consumption constraints. The operating condition may also be a default operating condition that the processor system adopts after powering up the processor system. Step 21 of determining the operating condition may also simply comprise assuming a default operating condition, if for example no further information about the operating condition is available. In a second step 22, the first reference voltage is adjusted and the supply voltage is compared with the first reference voltage. This occurs nearly simultaneously since the comparison can be started as soon as the first reference voltage is set. The comparison can be done temporarily or continuously according to the requirements for monitoring the supply voltage. In a third step 23, the second reference voltage is adjusted and the supply voltage Vcc is compared with the second reference voltage. Regarding the chronological relation between adjusting the reference voltage and comparing this reference voltage with the supply voltage for step 23, the same as for step 22 applies.

Several modifications within the described sequence are possible as long as at least two reference voltages are adjusted at a different time. The beginning and the duration of other steps can be modified within the limits of technical possibilities. Thus, the step of determining the operating condition can also be started later after one or more reference voltages are adjusted as long as the necessary information for adjusting a reference voltage is available. The step of determining the operating condition may also be continued until after the adjusting of one or more reference voltages and may also be an ongoing process during the whole operation of the processor system. Comparing the supply voltage with the reference voltages may also comprise the comparison with only one reference voltage. The step of comparing the supply voltage with at least one reference voltage may be started as soon as at least one reference voltage is adjusted or it can be assumed that it has the right value. If, for example, for a reference voltage no change is needed since from the beginning of the operation of the processor system it has the right value, it can be used right away for comparing it with the supply voltage.

Figure 3:
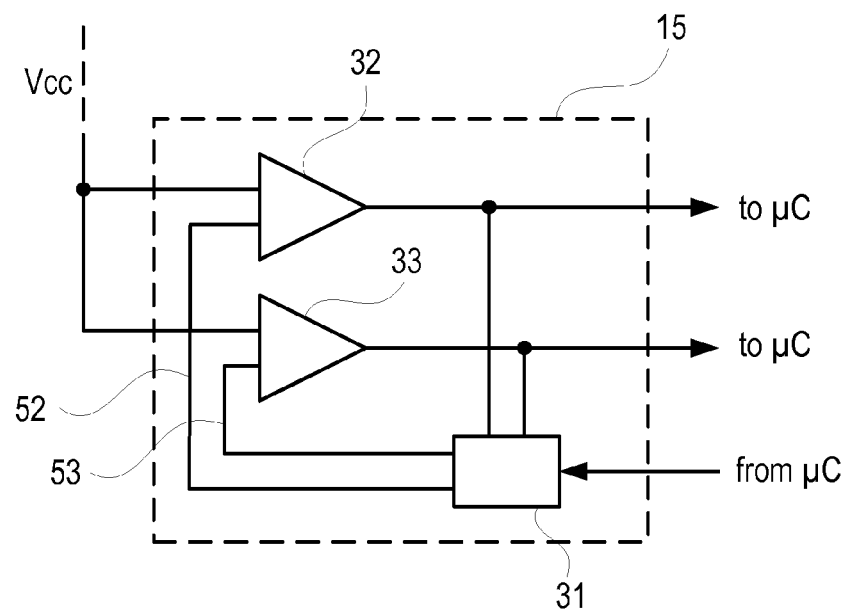
FIG. 3 shows details of a monitoring block of FIG. 1.

FIG. 3 shows a schematic block diagram in more detail of an embodiment of the monitoring device 15. It comprises a first comparator 32 and a second comparator 33 each comprising a reference input, a compare input and an output leading outside of the monitoring device 15 to the microcontroller 13. The voltage inputs of the comparators 32, 33 are coupled to the line carrying the supply voltage Vcc. These voltage inputs can be connected directly to the supply voltage line or indirectly via an interconnection circuit that, for example, transforms the supply voltage Vcc. This can be a simple voltage divider dividing the supply voltage by a fixed coefficient. This can bring the supply voltage within a lower voltage range more favorable for the voltage inputs of the comparators 32, 33. As the supply voltage at the compare input falls below the voltage at the reference input, the output of the corresponding comparator becomes low.

The reference inputs of the comparators 32, 33 are coupled to reference outputs of a control circuit 31. The control circuit 31 comprises digital-to-analog converter circuitry capable of generating an adjustable reference voltage for each comparator. This can be achieved, for example, by a plurality of digital-to-analog converters where the digital input can be locked or by a plurality of sample and hold elements for storing analog values for the different reference voltages.

The control circuit 31 comprises comparator inputs coupled to the outputs of the comparators 32, 33. Thus, the control circuit 31 is able to gather information on the value of the supply voltage. Furthermore, control circuit 31 comprises a control input coupled to the microcontroller 13 in order to receive control commands for controlling and/or programming the control circuit 31. The control commands can include information about values for the reference voltages and about the gradient of the reference voltages over time.

The outputs of the comparators 32, 33 are connected to inputs of the microcontroller 13 that can trigger certain responses from the microcontroller 13 or that can be read by the microcontroller 13. Such inputs can comprise, for example, an interrupt or a reset input. Furthermore, such inputs can lead to programmable registers or flags that can be read by the microcontroller 13.

For example, if the output of comparator 32 is coupled to the reset input of the microcontroller 13, the microcontroller 13 is reset if the supply voltage falls below the reference voltage at comparator 32. Alternatively, if the output of comparator 32 is coupled to an interrupt input, an interrupt would be triggered. A simple flag or a register bit can be set by comparator 32 in the same way.

In one embodiment the control circuit 31 is a state machine that can switch through different states, each state being related to specific values for the reference voltages and rules for the switching into the next state. A switch from one state to the next state is also referred to herein generally as a change. The state machine is provided with a clock and is able to switch synchronously and also asynchronously through the states or changes. The asynchronous operation can be important in operating modes in which no reliable clock is present in the system, such as due to a supply voltage that is too low. The switching from one state into another state can be triggered by a signal from the microcontroller 13 at the control input or by an internal timer of the control circuit 31. Furthermore, the switching from one state into another state can be triggered by a change of the output signal of a comparator 32, 33. A sequence can be stored within the control circuit 31 which can be started by the control input or also by a certain state of an output of a comparator 32, 33. These sequences may comprise time-controlled changes that are carried out after a predetermined period of time or state-controlled changes that are carried out after a certain event occurs. The state-controlled changes can be carried out on the basis of occurrences generally related to the power supply of the processor system or to an operating condition thereof since the operating condition may affect the power consumption which in turn may affect the power supply. In order to communicate the occurrences used for the state-controlled changes to the control circuit 31, the appropriate connections have to be established. This can comprise direct connections, such as to the outputs of the comparators 32, 33, or transmitting the relevant information over other connections to the control circuit, such as the control input of the control circuit 31 connected to the microcontroller 13.

The sequence of changes may be modified with respect to the order of the changes or presence of certain changes in the sequence such that some changes may be omitted. Modifications of the sequence of changes can be based on any available system information, especially to that related to the power supply, such as the operating mode or the power consumption of the processor system or the value of the supply voltage.

The switching through the states mainly is carried out by the monitoring device 15 autonomously without external triggering. A triggering event may be defined for each change, including whether a change is triggered by a system occurrence, such as a certain system state or the end of a certain time period, or whether a change is triggered by a signal created by the system, such as a program executed by the microcontroller 13 or by a signal provided from outside of the system.

Figure 4:
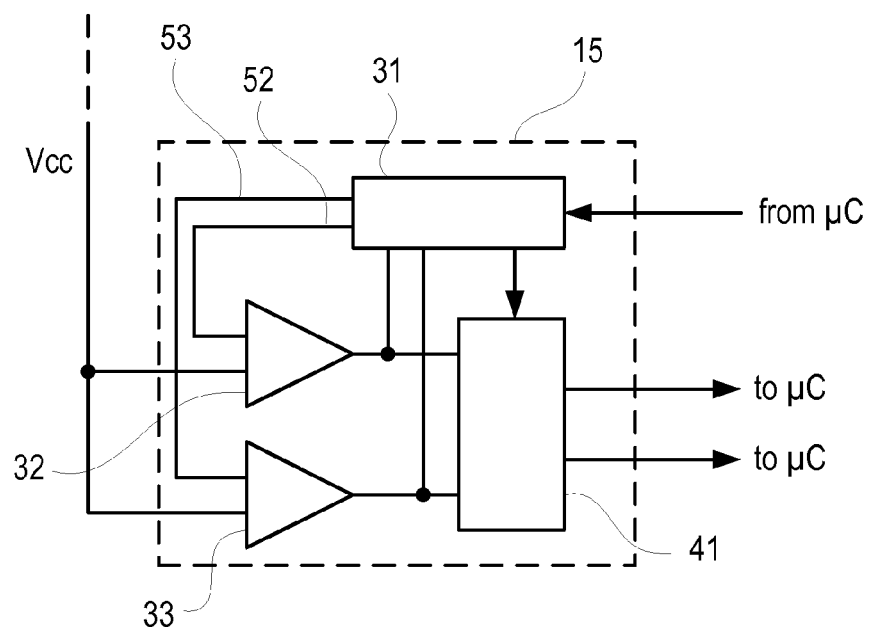
FIG. 4 shows details of a further monitoring block of FIG. 1.

FIG. 4 shows a schematic block diagram of a further embodiment of the control circuit 15. It again comprises a first comparator 32 and a second comparator 33, each having a reference input, a compare input and an output. The compare inputs are coupled to the supply voltage of the system and the reference inputs are coupled to reference outputs of a control circuit 31. Control circuit 31 has further inputs coupled to the outputs of the comparators 32, 33 and a control input coupled to the microcontroller 13 for receiving control signals.

The control circuit 15 of this embodiment further comprises a crossbar circuit 41 with signal inputs, signal outputs and a control input. Crossbar circuit 41 is generally a circuit that can establish connections between one or more signal inputs and one or more signal outputs based on control signals from the control circuit 31. The number of the signal inputs is independent from the number of signal outputs. In the depicted embodiment, the crossbar circuit 41 has two signal inputs and two signal outputs and can connect each signal input to none or at least one of the signal outputs.

Crossbar circuit 41 may also be configured to carry out a logic operation on the signals applied to the signal inputs and to output, the result of the logic operation at a signal output, and may be programmable in order to change a property related to how the output signals are generated. Each output of the crossbar circuit 41 can be the result of a specific logic operation. Each logic operation can use none or at least one of the input signals as an argument. If no input signal is used, the output signal may be a fixed value.

If used as a power supply for a microcontroller, one signal output is coupled to an interrupt input and one signal output is coupled to a reset input of the microcontroller 13. Thus the effect the output of a specific one of the comparators 32, 33 has can be configured. Depending on which signal output of the crossbar circuit 41 is connected to the specific compare input, the output signal of this specific comparator 32, 33 can cause an interrupt or a reset of the microcontroller 31.

Figure 5:
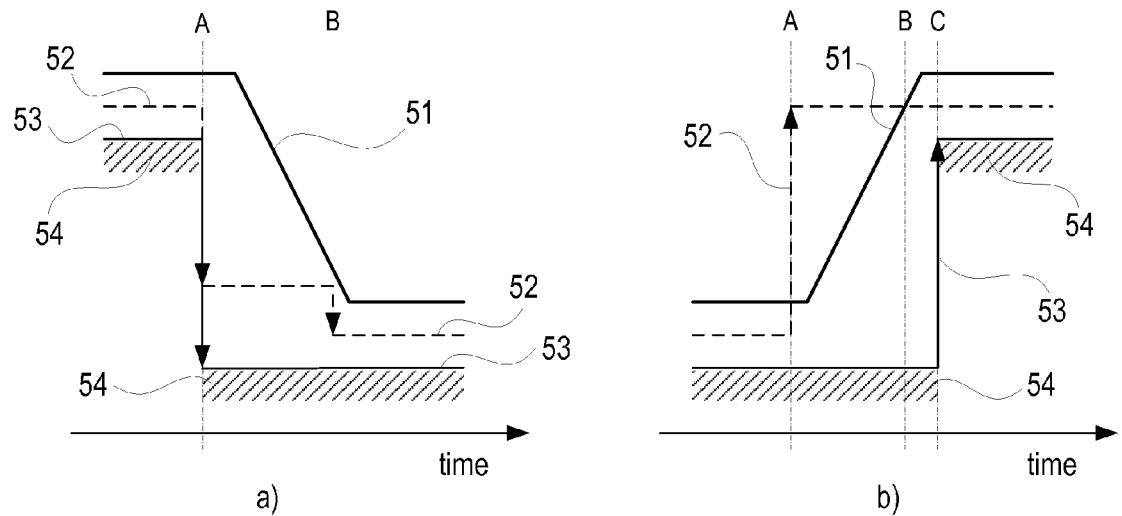
FIG. 5 shows timing diagrams for the supply voltage and reference voltages used in a method for monitoring the supply voltage in accordance with an embodiment of the present invention.

FIG. 5 shows two timing diagrams a) and b) of the supply voltage 51 of the processor system 11. The diagrams show furthermore a first reference voltage 52 and a second reference voltage 53, both generated by the control circuit 31. The first diagram a) shows a reduction of the supply voltage and the second diagram b) shows an increase of the supply voltage. The reference voltages are adjusted accordingly.

In these and all further timing diagrams, reset activation areas 54 are shown as hatched areas that indicate when a reset is triggered. As soon as the supply voltage falls within or below these areas the processor system is reset. Furthermore in all diagrams the curve of the first reference voltage 52 is plotted with a dashed line and the curve of the second reference voltage 53 is plotted with a continuous line.

In diagram a), the second reference voltage 53 is assigned to the activation of the reset. This can be done by connecting the output of the comparator, which has an input coupled to the second reference voltage 53, to a reset input. In the depicted embodiment, the second reference voltage 53 is fed to an input of the second comparator 33 and the output of the second comparator 33 is coupled to a reset input of microcontroller 13. The polarity of the inputs of the comparators 32, 33 depends on whether the outputs of the comparators 32, 33 are connected to high-active or low-active inputs. The reset input in this example is low-active and accordingly the output of second comparator 33 is low only when the supply voltage connected to the compare input falls below the second reference voltage 53 connected to the reference input. Thus in the embodiment of FIG. 5 the reset activation areas 54 are always located under the second reference voltage 53.

Before time A and after time B, the first comparator 32 is assigned to a warning function in order to inform microcontroller 13 when supply voltage 51 falls below a certain warning level corresponding to the first reference voltage 52. First reference voltage 52 is connected to the compare input of the first comparator 32. The output of the first comparator 32 is coupled to an interrupt input of microcontroller 13. Thus an interrupt is triggered when the supply voltage falls below the first reference voltage 52.

In the embodiment shown in FIG. 5, the first reference voltage 52 assigned to the warning function is always higher than the second reference voltage 53 assigned to the reset. Thus the outputs of both comparators 32, 33 can remain coupled to the corresponding inputs of the microcontroller 13 for the entire time.

At the beginning of the time period shown by diagram a) of FIG. 5, the processor system 11 before time A is in its high speed operation mode, the supply voltage 51 being at a high level that allows the high speed operation of the processor system 11. Before the decrease of the supply voltage 51 begins, the first reference voltage 52 and the second reference voltage 53 at time A, are decreased simultaneously but to different values. After time A the supply voltage is decreased following a slope during a certain slope time period until reaching a low level lower than the high level for a power saving mode. In the power saving mode, data processing by the processor system 11 is still possible but at a reduced speed. Before the low level is reached and still within the slope time period, both reference voltages 52, 53 are reduced simultaneously at time B. Both reference voltages 52, 53 always remain below the supply voltage 51 and the first reference voltage 52 remains always above the second reference voltage 53 during the entire time period shown in diagram a).

The second reference voltage 53 is assigned to the reset function during the entire time shown in diagram a). The first reference voltage 52 is assigned to the warning function before time A and after time B. Between time A and time B, the first reference voltage 52 and the first comparator 32 are used for supervising the supply voltage 51. In particular, the first reference voltage 52 is used to determine when the supply voltage 51 has reached a certain voltage level that can be used as a sign that the supply voltage 51 for a new operation mode is reached. In the depicted case, time B corresponds to the time when the supply voltage 51 falls below the first reference voltage 52 between time A and time B. This is detected by the first comparator 32 and triggers the reassignment of the first reference voltage 52 to the warning function. For this purpose the first reference voltage 52 is lowered to a value below the low level for the supply voltage 51 and above the second reference voltage 53.

Diagram b) of FIG. 5 shows the increase of the supply voltage 51 from the low level back again to the high level. Again the change of the supply voltage occurs following a slope during a slope time period. Already before the slope time period begins at time A the first reference voltage 52 is increased to a level above the actual level of the supply voltage 51 and below the high level that will be reached by the supply voltage 51 at the end of the slope.

Before time A, the first reference voltage 52 is assigned to the warning function. Beginning at time A the first reference voltage 52 is used for supervising the supply voltage 51 and to determine when it has reached a certain voltage level on the slope. For this purpose, the first reference voltage 52 is increased at time A to a value that is sufficiently near the high level to allow the operation of the processor system 11 in the operation mode that requires the high level for the supply voltage 51. The time when the supply voltage 51 crosses the first reference voltage 52 in diagram b) is time B. At time B, the operation mode is changed and the first reference voltage 52 is assigned again to the warning function. A certain time period after time B when the supply voltage almost reaches the high level in time C, the second reference voltage 53, which also remained assigned to the reset function, is increased to a value below the value of the first reference voltage 52. During the increase of the second reference voltage 53, a reaction of the output of the second comparator 33 may be disregarded. Thus possible glitches at the output of the second comparator 33 due to a change of an input voltage do not erroneously cause an interrupt or a reset. Since at time C the first reference voltage 52 has already been amended some time ago at time A and comparator 32 at time C is operating reliably, the supply voltage 51 can be supervised only by the first comparator 32.

Generally, for suppressing noise, time gaps like those between time B and time C in diagram b) of FIG. 5 can be introduced. If the assignment of a reference voltage 52, 53 is changed, activated or deactivated, it may be advantageous to wait for a certain time period until the assignment of a further reference voltage 52, 53 is changed, activated or deactivated.

Figure 6:
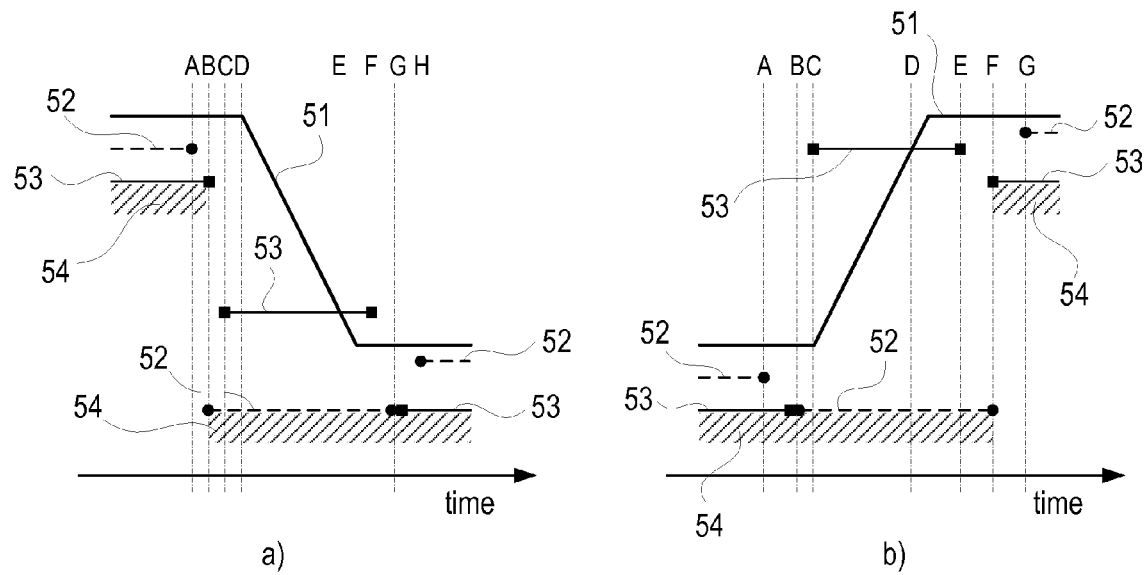
FIG. 6 shows timing diagrams for the supply voltage and reference voltages used in a method for monitoring the supply voltage in accordance with a further embodiment of the present invention.

FIG. 6 shows a second embodiment for the adjustment of the reference voltages 52, 53. The supply voltage 51 follows the same curve as in FIG. 5. One difference is that after a modification of a reference voltage 52, 53 the operation of the corresponding comparator 32, 33 is suspended for a given time period in order to let the comparator 32, 33 resume a stable operation. This increases reliability of the operation in particular, if the used comparators generate a disturbance like a spike or glitch after the adjustment of the reference voltage at its input. The suspension of the operation of a comparator 32, 33 is indicated by a gap in the curve of the reference voltage 52, 53 fed to this comparator 32, 33. In order to highlight the gaps, each end point of the curves of the reference voltages 52, 53 on both sides of the gap is marked with a square for the second reference voltage 53 and with a circle in case of the first reference voltage 52.

In FIG. 6, diagram a) again shows the decrease of the supply voltage 51 and diagram b) the increase of the supply voltage 51. Diagram a) shows the transition of a high speed operation mode in which the supply voltage 51 is on a high level to a power save mode in which the supply voltage 51 is on a low level. In the high speed operation mode, the first reference voltage 52 is assigned to a warning function until time A, generating an interrupt if necessary, and the second reference voltage 53 is assigned to the reset function until time B, also generating a reset if necessary.

As later will become apparent, this assignment will change. This assignment is changed by means of the crossbar circuit 41. If the assignment of a specific reference voltage 52, 53 is to be changed, for example from the warning function to the reset function, the comparator 32, 33 receiving said reference voltage 52, 53 is connected through the crossbar circuit 41 first to the interrupt input and then to the reset input respecting a suspension gap. A signal on the interrupt triggers an interrupt that can be used in several ways depending on the programming of the microcontroller 13 and the operation phase or mode. The interrupt can be used for the warning function or for a supervising function in order to monitor the level of the supply voltage 51. During the suspension gap, a reference voltage 52, 53 is not connected to either the interrupt input or to the reset. For an assignment change, the internal connections of the crossbar circuit 41 between its signal inputs and its signal outputs are modified. This modification advantageously is glitch-free. Since the outputs of the comparators 32, 33 are digital, the crossbar circuit 41 may be a digital circuit.

At time A, operation of the first comparator 32 is suspended and the first reference voltage 52 is lowered. Operation of the first comparator 52 is resumed at time B. Between time A and time B, only the second comparator 53 is operative. The operation of a comparator 32, 33 can be suspended, for example, by stopping the operation of the comparator 32, 33 by inhibiting the output of the comparator 32, 33. In the depicted embodiment, the respective connection through the crossbar circuit 41 is interrupted and thus the transmission of the output of the respective comparator 32, 33 inhibited. In order to resume the operation of a comparator 32, 33 the respective connection through the crossbar circuit 41 is re-established.

At time B, operation of the first comparator 52 is resumed with the lowered first reference voltage 52 and the operation of the second comparator 33 is suspended. Furthermore, at time B, the crossbar circuit 41 is switched such that the output of the first comparator 52 is coupled to the reset input. The second reference voltage 53 is lowered to a value above the low level of the supply voltage 51 and will be used for monitoring the supply voltage 51 and particularly to monitor when the supply voltage 51 has reached a value sufficiently close to the low level for the power save mode. The second reference voltage 53 is adjusted for this purpose to a value above and close to the low level.

At time C, operation of the second comparator 33 is resumed and the crossbar circuit 41 is switched such that the output of the second comparator 33 is coupled to the interrupt input of the microcontroller 13. At the same time on the side of the microcontroller 13, the interrupt is assigned to the supervising function.

At time D, the decrease of the supply voltage 51 following a slope begins. The decrease of the supply voltage 51 at time E reaches the second reference voltage 53 which triggers the second comparator 33 which in turn causes an interrupt. By this the microcontroller 13 can detect when the supply voltage 51 reaches the value of the second reference voltage 53 and is low enough to enter the power save mode. After time E, the supply voltage 51 continues falling until it reaches the low level.

The switching of the second comparator 33, indicating in this situation that the supply voltage 51 has fallen below the second reference voltage 53, can be used for triggering subsequent steps. These steps can include adjusting reference voltages 52, 53, switching the crossbar circuit 41 or modifying the reaction of the processor system to this event.

At time F, operation of the second comparator 33 is suspended until time G and the second reference voltage 53 is lowered to the same value as the first reference voltage 52. At time G, operation of the first comparator 32 is suspended and crossbar circuit 41 is switched such that the output of second comparator 33 is coupled to the reset input. The first reference voltage 52 is raised to a value below the low level of the supply voltage and above the level of the second reference voltage 53. The time gap between time E and time F is used for noise suppression.

At time H, operation of the first comparator 52 is resumed and crossbar circuit 41 is switched such that the output of the first comparator 32 is connected to the interrupt input of the microprocessor 13. Thus, at the end of the transition the first reference voltage 52 is assigned again to the warning function, triggering an interrupt if necessary, and the second reference voltage 53 is assigned to the reset function, also triggering a reset if necessary.

In order to suspend the operation of a comparator 32, 33 the output of the comparator can be blocked or inhibited such that its state cannot change or the comparator 32, 33 can be ignored by a connected logic. A further way to suspend the operation of a comparator 32, 33 is to use the crossbar circuit 41 and simply to disconnect the output of this comparator 32, 33 from all outputs of the crossbar circuit 41.

Diagram b) of FIG. 6 shows the transition of the supply voltage 51 from the low level to the high level. Again at the beginning the first reference voltage 52 is below the supply voltage 51 and is assigned to the warning function, and the second reference voltage 53 is below the first reference voltage 52 and is assigned to the reset function. At time A, the operation of the first comparator 32 is suspended and the first reference voltage 52 is lowered to the value of the second reference voltage 53. At time B, operation of the first comparator 32 is resumed and operation of second comparator 33 is suspended. At the same time, the crossbar circuit 41 is switched such that the output of the first comparator 32 is coupled to the reset input. Thus, at time B, the assignment of the reset function is handed over from the second reference voltage 53 to the first reference voltage 52 by means of crossbar circuit 41 coupling the first comparator 32 receiving the first reference voltage 52 to the reset input. By adjusting the first reference voltage 52 prior to or at the moment of the handover, the reset activation area and the thus the voltage level under which a reset is caused remain unchanged. The second reference voltage 53 at time B is changed to a level above the low level and slightly below the high level.

At time C, operation of the second comparator 33 is resumed, the increase of supply voltage 51 is started and the output of the second comparator 33 is coupled through the crossbar circuit 41 to the interrupt input of the microcontroller 13. The second comparator 33 then indicates that supply voltage 51 is below second reference voltage 53. However, the second comparator 53 is not used to detect a supply voltage that is too low in order to take counter measures but rather to determine when the supply voltage 51 has nearly reached the high level. This is achieved on the side of the microcontroller 13 that takes an interrupt in this operation phase as the signal that the supply voltage 51 has crossed the value of the second reference voltage 53, which happens at time D. As soon as the supply voltage 51 rises above the second reference voltage 53, the second comparator 33 again switches its state. This can be detected and used for the further process of adjusting the reference voltages by the microcontroller 13 controlling the monitoring device 15 or directly by the control circuit 31. In the latter case, it is not necessary to forward this information to the microcontroller 13, and within the crossbar circuit 41 during this phase between time C and E the connection between the output of the second comparator 33 and the microcontroller 13 can be disrupted. Again, after the supply voltage 51 has been detected above the second reference voltage 53, a time gap between time D and time E is introduced to reduce the noise.

At time E, operation of the second comparator 33 is suspended and the second reference voltage 53 is lowered. The second reference voltage 53 may be lowered such that the difference between the high level of supply voltage 51 and the new level for the second reference voltage 53 after time E is the same as between the low level of supply voltage 51 and the old level for the second reference voltage 53 before time B. Generally seeking, the differences between the supply voltage 51 and the first reference voltage 52 and the second reference voltage 53 may be the same before and after the transitions.

At time F, operation of the first comparator 32 is suspended and operation of the second comparator 33 is resumed. At the same time, crossbar circuit 41 is switched such that the output of the second comparator 33 is coupled to the reset input. Thus the reset function is handed back over to the second reference voltage 53. Furthermore, at time F, the first reference voltage 52 is raised to a level below the high level for the supply voltage 51 and above the second reference voltage 53. At time G, operation of the first comparator 52 is resumed and from then on is used for the warning function.

The reset function of the method depicted in FIG. 6 can be continued without interruption by alternating two or more reference voltages 52, 53 for the reset function. A reference voltage 52, 53 not used during a specific time period for the reset function can be used during this time period for monitoring the gradient of the supply voltage 51 to determine when the supply voltage reaches a certain level. The detection of this moment can be used to trigger further action, such as entering a different operation mode or changing the setup of the method for supervising the supply voltage 51.

Figure 7:
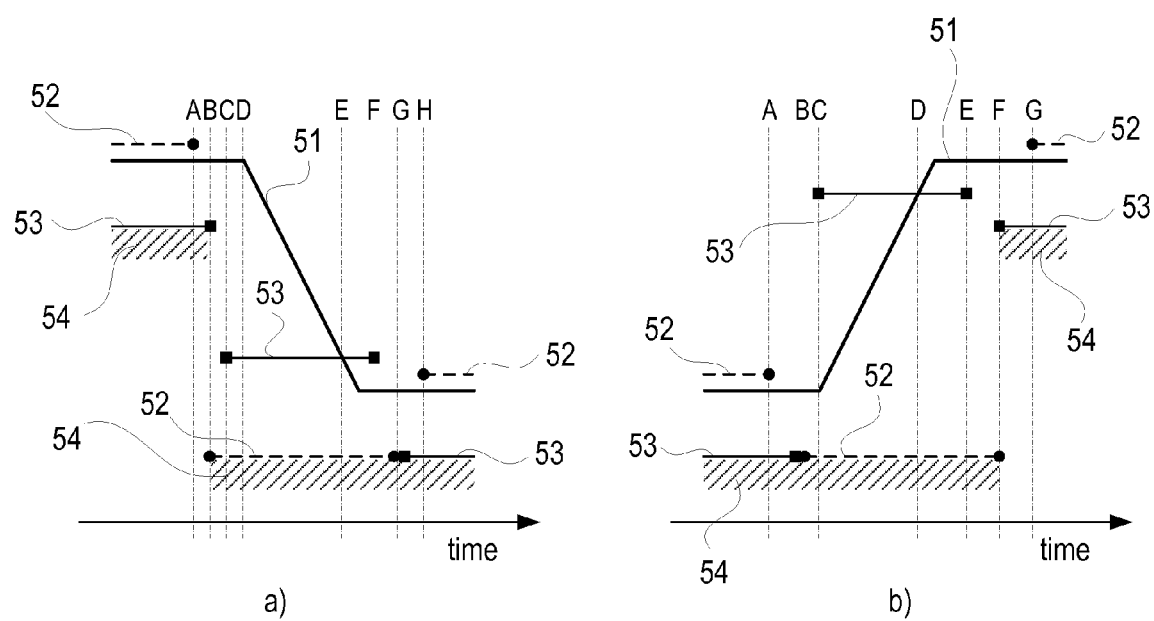
FIG. 7 shows timing diagrams for the supply voltage and reference voltages used in a method for monitoring the supply voltage in accordance with a further embodiment of the present invention similar to the embodiment of FIG. 6.

FIG. 7 shows an embodiment similar to the embodiment of FIG. 6, with the first reference voltage 52 before and after the transition used to detect an overvoltage instead of an undervoltage. For this purpose the second reference voltage 52, except for the time between time A and time H, is kept with a certain difference above the target value for supply voltage, i.e. before the transition above the high value and after the transition above the low value. During the transition, the second reference voltage 53 is used between time C and time F for monitoring the supply voltage 51 that at time E crosses the second reference voltage 53, which is registered as an interrupt by the microcontroller 13.

Between time B and time G, the first reference voltage 52 is used for the reset function. Before time B and after time G, the second reference voltage 53 is used for the reset function thus assuring an undervoltage detection without interruption.

Although in the exemplary embodiments depicted in diagrams a) of FIGS. 6 and 7 the supply voltage 51 begins rising at time D following a delay after the reference voltages 52, 53 have been adjusted, this delay is not mandatory. The supply voltage 51 can be adjusted independently from the reference voltages 52, 53 as long as no conflict exists with the voltage constraints established by the reference voltages 52, 53.

In both diagrams a) and b) of FIG. 6 and FIG. 7, one reference voltage is adjusted while the other reference voltage is kept constant. Furthermore, both reference voltages or both comparators respectively can be alternated for a specific monitoring function, like the warning function or the reset function as depicted. For this purpose, the connection to an input related to this monitoring function, for example the interrupt or the reset input, is handed over from the output of a previous comparator provided with a previous reference voltage to the output of a subsequent comparator provided with a subsequent reference voltage, thereby also handing over the assignment of this monitoring function from the previous reference voltage to the subsequent reference voltage. The operation of a comparator can be suspended as long as its output is not connected to an active input.

This handover process can furthermore include an adjustment of the reference voltage used for the monitoring function such that before the handover the subsequent reference voltage is adjusted to a value different from the previous reference voltage. Thus, the monitoring function after the handover is continued with a different reference voltage. The assignment of a comparator to a monitoring function can be changed for the handover by means of a crossbar circuit on a hardware basis or also on a software basis by means of the programming of the processor system.

In further embodiments, more than two reference voltages and accordingly more than two comparators can be used. With more than two comparators and reference voltages, the handover process for seamless adjustments can be carried out for more than one monitoring function. For example, with three reference voltages, both the interrupt function and the reset function can be adjusted with this alternating handover method. With three reference voltages, it may be necessary to adjust the reference voltages assigned to both monitoring functions at different times because only one reference voltage is left for the intermediate phase of the handover process. If, generally speaking, at least twice as many reference voltages are used as monitoring functions are present, the active reference voltage for each monitoring function can be adjusted according to the handover process seamlessly, independent from the adjustment of the active reference voltage of the other monitoring functions. However, for n monitoring functions only n reference voltages with one additional reference voltage can be used. If only one additional reference voltage is used, the seamless transitions have to be carried out subsequently.

If more than two reference voltages are used, two reference voltages may be adjusted at the same time, forming a group without departing from the scope of the present invention as long as at least two reference voltages are adjusted at a different time.

In a further embodiment, the supply voltage prior to the comparison with the two reference voltages is amplified or lowered by a programmable amplifier or voltage divider. In such a case, the adjustment of a reference voltage is achieved in an equivalent manner by adjusting the corresponding programmable voltage divider or programmable amplifier. By this two independent comparison operations can be carried out that can be adjusted chronologically independent from each other. Thus, a supervised voltage level for the supply voltage can be adjusted by alternating at least two comparison operations in order to avoid a gap in the supervising function.

The invention claimed is:

1. A method for monitoring a supply voltage of an electronic device comprising the steps of:
    determining an operating condition of the electronic device; adjusting a plurality of reference voltages dependent on the operating condition of the electronic device, wherein each of the plurality of reference voltages is adjusted at a different time;
    comparing the supply voltage of the electronic device with at least one of the plurality of reference voltages; and
    wherein the step of adjusting the plurality of reference voltages further comprises adjusting a single one of the plurality of reference voltages while keeping another of the plurality of reference voltages constant.

2. The method of claim 1, wherein the step of comparing further comprises suspending a comparison with one reference voltage of the plurality of reference voltages, if that one of the plurality of reference voltages is adjusted.

3. The method of claim 2, wherein the step of suspending the comparison with one reference voltage of the plurality of reference voltages further comprises comparing the supply voltage with at least one other reference voltage of the plurality of reference voltages.

4. The method of claim 1, wherein the step of adjusting the plurality of reference voltages further comprises adjusting the plurality of reference voltages in steps defined by a target voltage after the adjustment.

5. The method of claim 4, wherein the step of adjusting the plurality of reference voltages further comprises adjusting the plurality of reference voltages in at least two consecutive steps.

6. The method of claim 5, wherein the step of adjusting the reference voltages further comprises initiating a following step a predetermined time period after a preceding step has been initiated.

7. The method of claim 5, wherein the step of adjusting the plurality of reference voltages further comprises comparing the supply voltage with a step trigger threshold and initiating a following step when the supply voltage reaches the step trigger threshold.

8. The method of claim 1, further comprising bringing the electronic device into a specific operating condition dependent on a result of the step of comparing.

9. The method of claim 8, wherein the step of bringing the electronic device into a specific operating condition further comprises programming the operating condition.

10. The method of claim 1, further comprising generating at least one monitoring signal based on a result of the step of comparing.

11. The method of claim 10, further comprising assigning, in a programmable manner, the at least one monitoring signal to a monitoring function.

12. The method of claim 11, wherein the step of assigning further comprises feeding the at least one monitoring signal to an input of the electronic device, said input being adapted to effect an action of the electronic device.

13. The method of claim 11, further comprising modifying the assignment of the at least one monitoring signal synchronously with the adjustment of the plurality of reference voltages.

14. A circuit for monitoring a supply voltage of an electronic device, the circuit comprising:
    a reference generator adapted to provide a plurality of adjustable reference voltages, the reference generator being capable of adjusting each of the plurality of reference voltages at a different time,
    a plurality of comparators each having a compare input and a reference input, the compare input of each of the plurality of comparators being coupled to the supply voltage, and the reference input of each of the plurality of comparators being coupled to a reference voltage; and
    a crossbar circuit comprising a plurality of inputs, each connected to one of the plurality of the comparators and a plurality of outputs, wherein the crossbar circuit is configured to programmably couple each of the plurality of inputs to none or at least one of the plurality of outputs.

15. A method for monitoring a supply voltage of an electronic device comprising the steps of:
    determining an operating condition of the electronic device; adjusting a plurality of reference voltages dependent on the operating condition of the electronic device, wherein each of the plurality of reference voltages is adjusted at a different time; and
    comparing the supply voltage of the electronic device with at least one of the plurality of reference voltages;
    bringing the electronic device into a specific operating condition dependent on a result of the step of comparing, wherein the step of bringing the electronic device into a specific operating condition further comprises programming the operating condition.

16. A method for monitoring a supply voltage of an electronic device comprising the steps of:
    determining an operating condition of the electronic device; adjusting a plurality of reference voltages dependent on the operating condition of the electronic device, wherein each of the plurality of reference voltages is adjusted at a different time;
    comparing the supply voltage of the electronic device with at least one of the plurality of reference voltages;
    generating at least one monitoring signal based on a result of the step of comparing; and
    assigning, in a programmable manner, the at least one monitoring signal to a monitoring function.

* * * * *